US007779690B2

(12) United States Patent
Jacobsen et al.

(10) Patent No.: US 7,779,690 B2
(45) Date of Patent: Aug. 24, 2010

(54) VIBRATING WIRE SENSOR USING SPECTRAL ANALYSIS

(75) Inventors: Larry Eugene Jacobsen, Nibley, UT (US); David L. Israelsen, Providence, UT (US); Jody A. Swenson, Hyde Park, UT (US)

(73) Assignee: Campbell Scientific, Inc., Logan, UT (US)

( * ) Notice: Subject to any disclaimer, the term of this patent is extended or adjusted under 35 U.S.C. 154(b) by 497 days.

(21) Appl. No.: 11/671,913

(22) Filed: Feb. 6, 2007

(65) Prior Publication Data

US 2008/0184800 A1 Aug. 7, 2008

(51) Int. Cl.
*G01N 29/12* (2006.01)
*G01N 29/46* (2006.01)

(52) U.S. Cl. .................. 73/579; 73/659; 73/862.41

(58) Field of Classification Search .............. 73/579, 73/160, 659, 778, 862.325, 1.82, 862.41
See application file for complete search history.

(56) References Cited

U.S. PATENT DOCUMENTS

| 3,290,930 | A | * | 12/1966 | Drinkwater ............ 73/862.325 |
| 3,889,525 | A | | 6/1975 | Bailey |
| 4,470,313 | A | | 9/1984 | Kalinoski et al. |
| 4,713,540 | A | | 12/1987 | Gilby et al. |
| 4,956,999 | A | | 9/1990 | Bohannan et al. |
| 5,365,787 | A | * | 11/1994 | Hernandez et al. ............ 73/660 |
| 5,463,907 | A | | 11/1995 | Herget et al. |
| RE35,793 | E | * | 5/1998 | Halpern ..................... 702/62 |
| 5,854,994 | A | * | 12/1998 | Canada et al. .............. 702/56 |
| 5,950,693 | A | * | 9/1999 | Noah et al. ................ 141/231 |
| 6,098,088 | A | * | 8/2000 | He et al. .................. 708/406 |
| 6,151,957 | A | * | 11/2000 | Enarson .................. 73/54.28 |
| 6,243,654 | B1 | * | 6/2001 | Johnson et al. ............. 702/85 |
| 7,152,019 | B2 | * | 12/2006 | Tarantola et al. .......... 702/186 |
| 2004/0105506 | A1 | * | 6/2004 | Baek et al. .............. 375/260 |
| 2005/0151083 | A1 | | 7/2005 | Favro et al. |

FOREIGN PATENT DOCUMENTS

JP     35615436 A  * 11/1981

OTHER PUBLICATIONS http://www.geokon.com/products/straingages.htm; Accessed Dec. 13, 2006.
http://en.wikipedia.org/wiki/Wireless_access_point; Wireless Access Point; Accessed Jan. 5, 2007.
www.slopeindicator.com; Durham Geo, Slope Indicator, Geotechnical & Structural Instrumentation; p. 77-78; VW Spot-Weldable Strain Gauge.

(Continued)

*Primary Examiner*—J M Saint Surin
(74) *Attorney, Agent, or Firm*—Workman Nydegger

(57) ABSTRACT

Systems and methods for analyzing the resonant frequency of vibratory wires within vibratory wire gauges. The resonant frequency of the vibrating wire is determined by using an interface that digitizes the response of an excited wire in the gauge. A transform then converts the digitized data into a frequency spectrum. The resulting spectrum is used to estimate the resonant frequency of the vibrating wire. The resulting measurement or estimate of the resonant frequency can be used to measure or determine some physical characteristic of the device or structure or system connected to the gauge.

25 Claims, 16 Drawing Sheets

OTHER PUBLICATIONS

Richard G. Lyons; Understanding Digital Signal Processing; book; 2004; pp. 523-525 & 579; Second Edition; Bernard Goodwin; Upper Saddle River, NJ.
http://www.campbellsci.com/pc9000; Accessed Dec. 13, 2006.
http://www.campbellscit.com/cr1000; Accessed Dec. 13, 2006.
http://www.campbellsci.com/avw1; Accessed Dec. 13, 2006.
www.slopeindicator.com; Durham Geo, Slope Indicator, Geotechnical & Structural Instrumentation; p. 77-78; VW Spot-Weldable Strain Gauge (Mar. 2006).
International Preliminary Report on Patentability issued Aug. 20, 2009 in International Application No. PCT/US2007/085435, Filed Nov. 21, 2007.

* cited by examiner

VIBRATING WIRE SENSOR USING SPECTRAL ANALYSIS

CROSS-REFERENCE TO RELATED APPLICATIONS

Not applicable.

BACKGROUND OF THE INVENTION

1. The Field of the Invention

The present invention generally relates to sensors. More particularly, embodiments of the invention relate to vibrating wire gauges.

2. The Relevant Technology

Vibrating wire gauges are widely used in a variety of applications, including measuring the magnitude of various properties and forces in many construction projects, including buildings, bridges, dams, piles, tunnel linings, pipelines, anchors, and others. The gauges have been adapted to monitor stress, strain, deflection, pressure, displacement, fluid level, angular motion, and temperature. Although advancing technology has produced other types of sensors, the vibrating wire gauge is often considered the best sensor for use in many settings, due to the sensor's long-term reliability.

The vibrating wire gauge generally operates on the vibrating wire principle which states that a wire vibrates at its resonant frequency when plucked. The resonant frequency is determined by $$v = \frac{n}{2l}\sqrt{\frac{\sigma}{\mu}},$$

where v is frequency in cycles/time, n is 1 cycles for the fundamental (non-harmonic) vibration mode, l is the length of the wire, σ is the wire tension (or stress) in force/area, and μ is the wire's length density in mass/length. The gauge is constructed so that a wire is held in tension inside a small diameter, thin-walled tube that is welded or otherwise attached to a structural member. An electromagnetic coil is used to pluck or excite the wire and measure the frequency of vibration. The frequency is then used to calculate any number of the structural member's physical properties, typically by applying a series of calibration factors.

In conventional systems, the frequency of the vibration is calculated by measuring the average period of the vibration based on the number of zero-crossings, or number of times the wave-form crosses the point of zero amplitude, in a specified time period. While these methods are computationally efficient, they are often subject to error because the methods are unable to distinguish between wire resonance and external noise sources. Particularly, noise sources with a small amplitude and a different frequency than the vibrating wire can introduce substantial errors.

Thus, a new approach is needed that is able to determine the resonant frequency of vibrating wire sensors with improved rejection of external noise sources and improved precision.

BRIEF SUMMARY OF THE INVENTION

The present invention relates to vibrating wire gauges. More specifically, the present invention relates to an improved method and system for analyzing the resonant frequency of vibratory wires within vibratory wire gauges.

According to the preferred embodiment of the present invention, the resonant frequency of the vibrating wire is determined by using an interface that digitizes the response of the excited wire. A transform is then used to convert the digitized response into a frequency spectrum. Finally, the vibrating wire's resonant frequency is determined from the transformed spectrum. Using this method, external noise sources can be isolated so that the resonant frequency of the vibrating wire is more accurately characterized by the system.

For example, many systems include a vibrating wire gauge that is used to measure some physical characteristic (e.g., strain, pressure, and the like). The resonant frequency of a vibrating wire in the gauge is often related to this physical characteristic. In one example, the vibrating wire is excited and the response is digitized. The digitized response then undergoes a transform in order to generate a frequency spectrum. The frequency of the response of the vibrating wire can then be determined or estimated using the frequency spectrum generated from the transform of the digitized response.

In another example, the digitized response is converted to a frequency spectrum. Then an interpolation process is performed on the frequency spectrum to determine or to estimate the resonant frequency of the vibrating wire in the gauge.

Once the resonant frequency is determined or estimated, the resonant frequency can be used for a variety of purposes. For instance, the gauge may be connected to a structural member and the resonant frequency can be used to measure or estimate a physical characteristic within the system such as strain, stress, load, deflection, fluid or air pressure, displacement, fluid level, angular rotation, fluid flow, precipitation, wind speed, rainfall, or snow-water-equivalent. In other configurations, the gauge may be stand alone, meaning that the gauge is not connected to any structural member, for instance in configurations where the gauge is measuring temperature or pressure.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to vibrating wire gauges and to methods for determining the resonant frequency of the vibrating wire using spectrum analysis. As briefly described above, the invention is suitable for use in connection with a vibratory wire gauge. More specifically, the present invention is useful in converting the raw response collected by a vibratory gauge mechanism to digitized data and converting the digitized data into an accurate estimation of the vibrating wire's resonant frequency. As previously mentioned, the resonant frequency of the vibrating wire can be used to calculate or estimate any number of physical characteristics, including but not limited to strain, stress, load, deflection, gas pressure, fluid pressure, displacement, fluid level, angular rotation, temperature, wind speed, fluid flow, precipitation, snow-water-equivalent and the like or any combination thereof.

Figure 1:
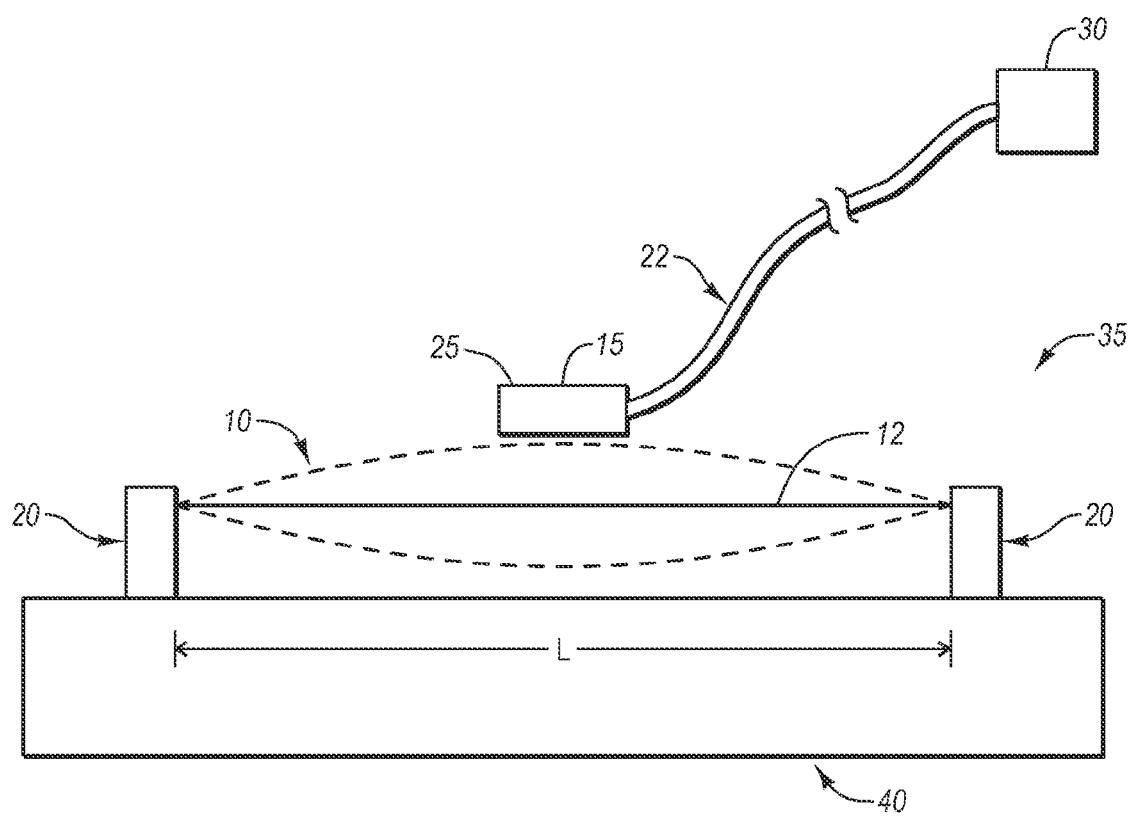
FIG. 1 illustrates an exemplary wire vibrating gauge suitable for use in connection with the present invention.

FIG. 1 shows a schematic representation of one embodiment of a vibratory wire gauge suitable for use in connection with the present invention. One of skill in the art can appreciate, with the benefit of the present disclosure, the applicability of embodiments of the invention to multiple variations of wire gauge sensors as well as to other types of sensors that generate data related to resonant frequencies. As discussed more specifically below, the method and system of the present invention may be used with any number of vibratory wire configurations.

For instance, the vibrating wire gauge may also be used in configurations where the gauge is not connected to any structural member. For example, a temperature gauge may calculate the temperature surrounding the gauge by measuring and calculating the different coefficients of thermal expansion of both the vibrating wire and the material holding the wire (both of which are considered a component of the "gauge" within the art). In another configuration, a vibrating wire may measure the pressure of a system without being attached to any structural member. In a pressure gauge configuration, the gauge includes a vibrating wire that is fixed on one end and is connected to a diaphragm on the other end. The gauge measure the pressure of the system as the diaphragm flexes in response to pressure changes. Thus, the vibrating wire gauge may be used in any number of configurations in association with the present invention, and is not limited to configurations where the gauge is attached to a structural member.

Thus, FIG. 1 illustrates a system capable of measuring the strain on the structural member, but is included by way of illustration only, and may represent any number of vibratory wire gauge configurations. Generally, vibratory wire strain gauges 35, such as the one pictured in FIG. 1, include a vibrating wire 12, tensioned between two securement means 20, which are each attached to the concrete, rock, soil, or structural member 40 being measured. The two securement means 20 may be attached to the structural member 40 using any number of attachment methods, such as welding, bolting, strapping, or the like. As previously described, the vibrating wire 12 of the gauge 35 is typically excited or plucked when the stain of the structural member 40 is being measured. One way of exciting or plucking the vibrating wire 12 has been to provide sufficient current through the wire 12 to provide a magnetic field to displace the center of the wire 12 from an initial or resting position. In this example, an electrical coil 15 located above the vibrating wire 12 is used to "pluck" the vibrating wire 12. Once the wire is displaced 10 (shown as dotted line), the current is turned off and the wire 12 vibrates freely at its resonant frequency. As previously described, the resonant frequency is related to the tension or strain in the vibrating wire 12.

The natural frequency of vibration is detected by a pickup sensor 25 mounted adjacent to the vibrating wire. The pickup sensor 25 usually includes a magnet located in the center of an electrical coil. As pictured, the coil used for pickup sensor 25 may be the same coil as used to pluck the vibrating wire 12. Alternatively, the pickup sensor 25 may be separate from the coil 15 used to pluck the wire 12.

The pickup sensor 25 is typically connected to a frequency counter used to measure the frequency of the wire. According to the vibrating wire principle, if the distance "L" between the securement means 20 changes, whether by expansion, compression, or other reason, there will be a change in strain or tension on the vibrating wire 12, and consequently a change in the resonant frequency of the wire 12.

As the frequency of the vibrating wire 12 is measured, a signal is transmitted, via a signal lead cable 22 to a data acquisition system, or datalogger, and a computer processing unit with a user interface for displaying the frequency to a user. Here, the data acquisition system, computer processing unit, and user interface are all displayed as a central processing unit 30, but one of skill in the art would understand that the processes may be located separately, removed, or combined to create any number of different configurations capable of utilizing the present invention.

As previously mentioned, the specific elements and configuration of the vibrating wire gauge may be modified without deviating from the scope of the present invention. By way of example, one end of the vibrating wire may be attached to a diaphragm to measure pressure, or in another configuration both ends of the vibrating wire may be attached to a material with a coefficient of expansion differing than the vibrating wire in a system designed to measure temperature. In each of these configurations, the vibrating wire is plucked and its response is measured and transmitted in a manner similar to the configuration illustrated in FIG. 1.

Figure 2:
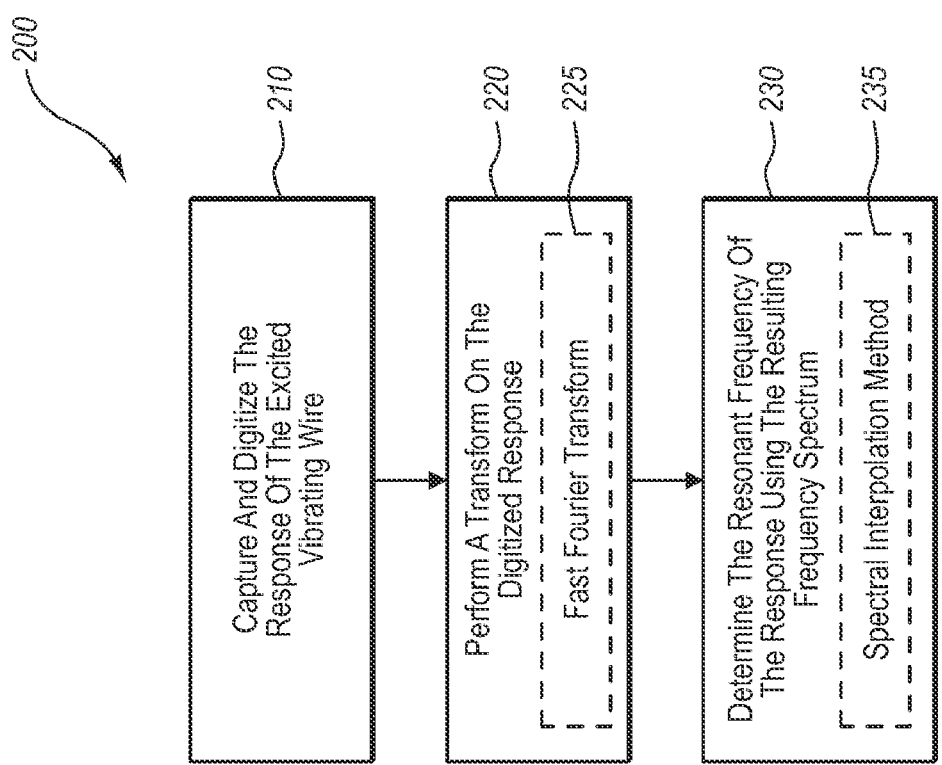
FIG. 2 illustrates a method and system for estimating the resonant frequency of the vibrating wire in the vibrating gauge according to the present invention.

After describing the basic mechanism behind the vibratory wire gauge, FIG. 2 illustrates one embodiment of a method 200 for analyzing the resonant frequency of the vibrating wire. In this example, the response of the excited wire is captured 210 and digitized, typically using an analog-to-digital converter. After receiving the digitized response, a transform is performed 220 on the digitized response to create a frequency spectrum. According to one embodiment, the transform includes a Fourier transform, and more specifically the transform is a Fast Fourier Transform 225. Next, the frequency spectrum is used to determine 230 the resonant frequency of the vibrating wire. According to one embodiment, an interpolation is used, and more specifically, the interpolation method may be a spectral interpolation method 235, such as the one described below. In other words, the interpolation can be used to determine the resonant frequency of the excited wire, which may then be used to calculate various properties of the structural member.

Advantageously, this method can distinguish signal from noise on the basis of frequency content. A noise source that is at a sufficiently different frequency, for example, may approach the same amplitude as the wire resonance before it impacts the measurement of the resonance frequency. Because noise often does not approach the same amplitude, the noise can be distinguished from the resonance signal based on frequency content. This example of wire spectrum analysis advantageously provides improved rejection of external noise sources that would otherwise impact the resonance measurements and also improves the precision of the measurement.

Although other transform methods may be used in association with the present invention, Fourier transforms, and more specifically, Discrete Fourier transforms (DFTs) are often employed in signal processing and related fields to analyze the frequency of sampled signals. Generally, the $\{x_n\}$ sequence represents a finite set of uniformly spaced time-samples of some signal x(t), where t represents time. Since a series of discrete time intervals are used instead of a continuous time sample and since the sample is only recorded for a finite period of time, the transforms include distortion. In order to increase to resolution of the sampled frequency axis, current algorithms often require a larger data sample or make use of a procedure referred to as "zero-padding," where zero-valued "samples" are added to the end of the original time samples in order to give a lengthened time sample.

Figure 3:
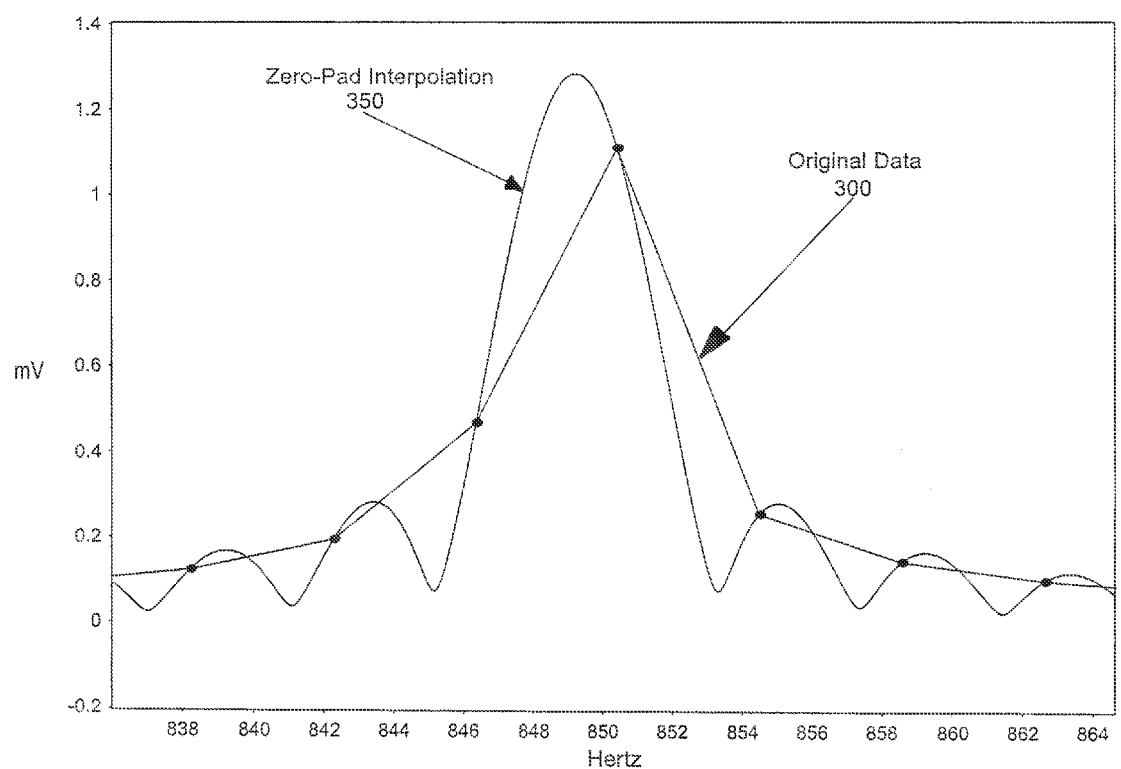
FIG. 3 is a chart illustrating a frequency spectrum of original data compared to a zero-pad interpolation series currently used in the art.
Figure 4:
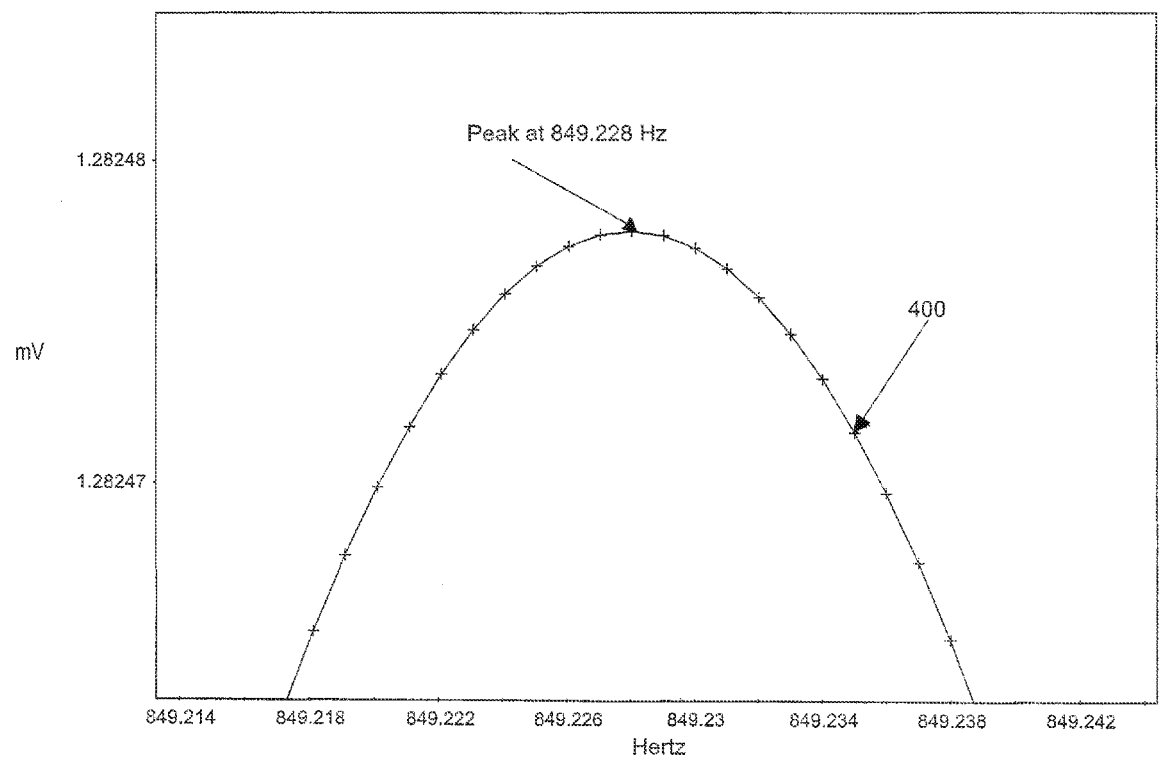
FIG. 4 is a zoomed-in chart illustrating the spectral peak displayed in FIG. 3.

FIG. 3 is a chart illustrating a spectrum of original data points 300 (4K points used) compared to a zero-pad interpolation series 350 (16M points). As shown, the zero-pad interpolation method 400 offers greater resolution and offers a more accurate estimation of the spectral peak, shown in FIG. 4, than offered with the original time series. Unfortunately, however, the zero-padded scheme requires large processing times to calculate results for the additional points and is computationally expensive. Similarly, an algorithm requiring the collection of a larger number of data samples would also require additional processing time. Additionally, the response of the vibrating wire typically decays after being excited, limiting the useable number of data samples in each response. Thus, one aspect of one embodiment is the ability to calculate results with a resolution and accuracy that is comparable to the results found with zero-padding and increased data sample algorithms, with faster processing speeds.

Many Fourier transform algorithms are available in the art that would be suitable for use in connection with the present invention. More particularly, fast Fourier transform (FFT) algorithms are well suited for environments requiring high processing speeds. One such FFT that may be used in connection with the present invention is the radix-2 FFT, or similar Cooley-Tukey algorithm, where a computer processor recursively breaks down a DFT of many data points into many smaller, computationally inexpensive, transforms.

Although several spectral interpolation methods may be used as an additional step to provide further resolution, a spectral peak location estimation algorithm, such as the algorithm described in "*Understanding Digital Signal Processing,*" by Richard G. Lyons, is particularly useful in quickly and efficiently estimating the frequency of the vibrating wire. The algorithm, wherein the center frequency is described as $m_{peak} = m_k - \text{real}(\delta)$, where $\text{real}(\delta)$ is the real part of the $\delta$ correction factor defined as:

$$\delta = \frac{X(m_{k+1}) - X(m_{k-1})}{2X(m_k) - X(m_{k-1}) - X(m_{k+1})}$$

Where $m_k$ is the integer index of the largest magnitude sample $|X(m_k)|$. Values $X(m_{k-1})$ and $X(m_{k+1})$ are the complex spectral samples on either side of the peak sample. Based on the complex spectral values, the signal's index-based frequency $m_{peak}$ is computed and applied using $$f_{peak} = m_{peak} \frac{f_s}{N}$$

to provide a frequency estimate in Hz, where $f_s$ is the sample rate and N is the length of x(t).

Figure 5:
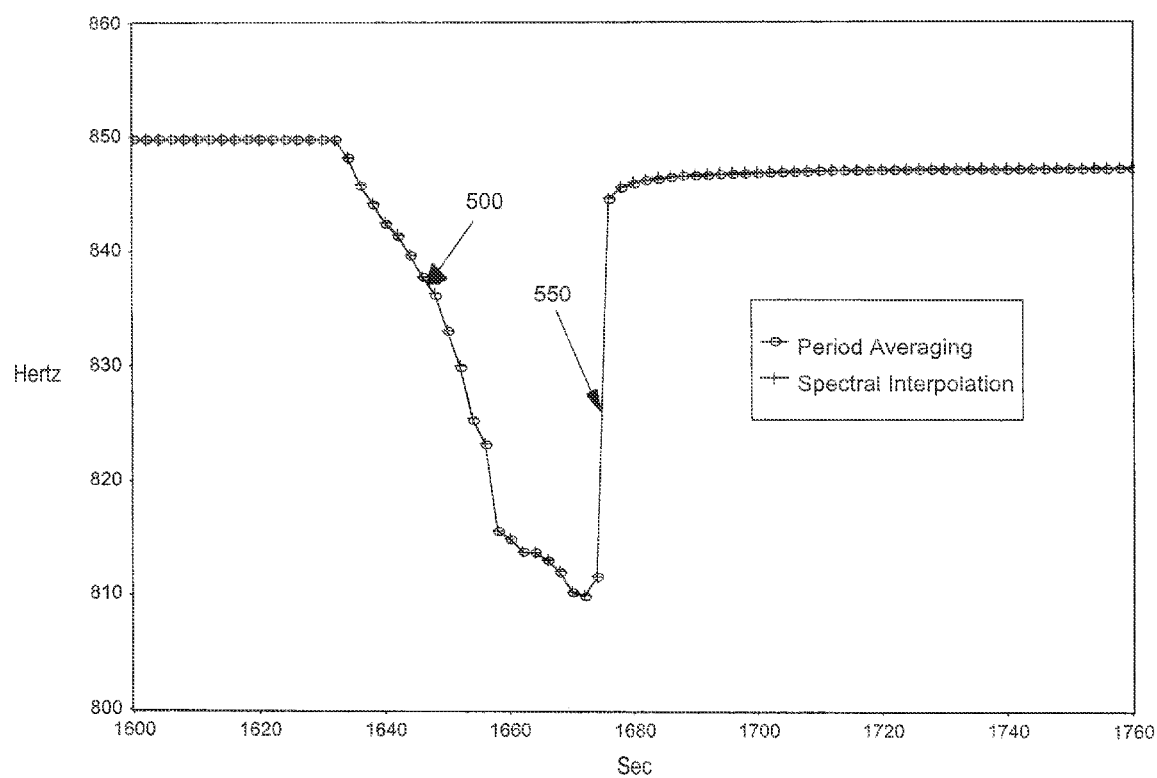
FIG. 5 is a chart comparing the results of the period-averaging, or zero-crossing method currently used in the art with the results of the spectral interpolation method described in the current invention in a loaded strain gauge scenario.
Figure 6:
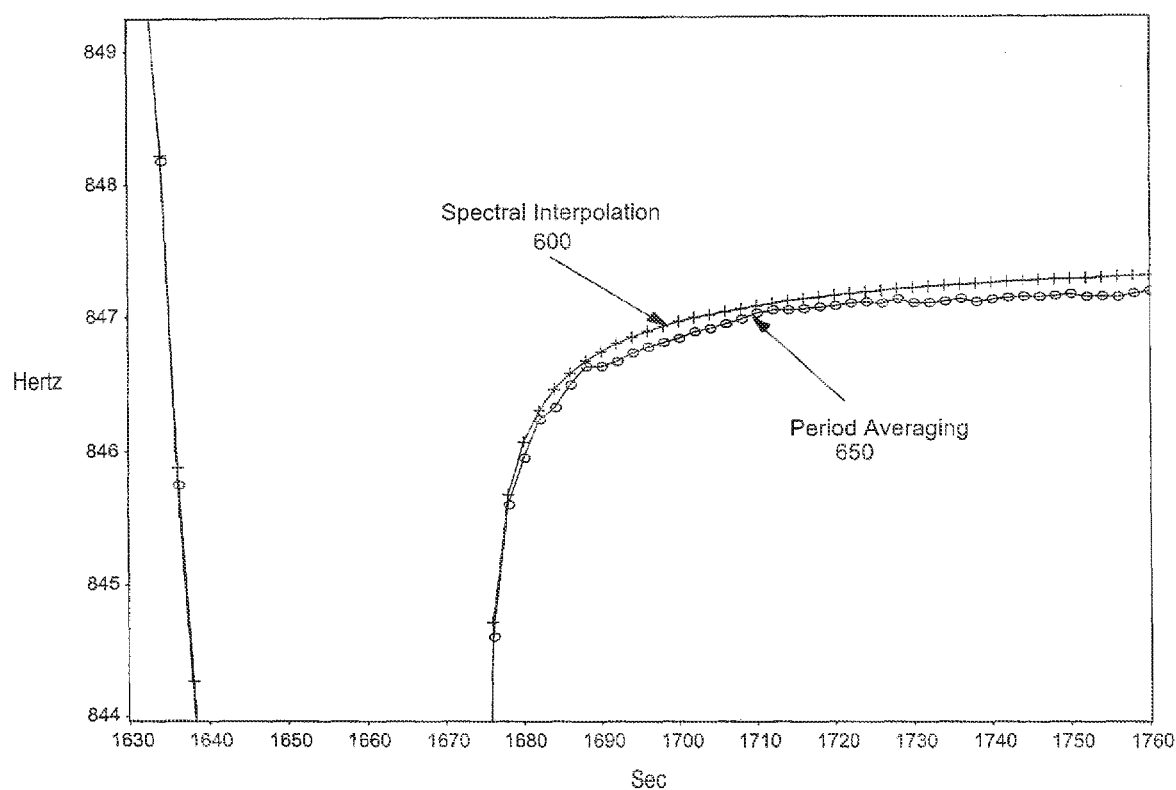
FIG. 6 is a chart further comparing the results of FIG. 5, with the x and y axes zoomed in to show the slight deviation between the two methods.

FIG. 5 is a chart comparing the results of the pulse count, or zero-crossing method 500 currently used in the art, together with the results of the spectral interpolation method 550 described in the current invention in a loaded strain gauge scenario. As shown, both methods give results of similar accuracy. FIG. 6 is a chart further comparing the results of FIG. 5, with the x and y axes zoomed in to show the slight deviation between the two methods. As illustrated in FIG. 5, the spectral interpolation method 600 provides similar accuracy compared to the period-averaging method 650.

Figure 7:
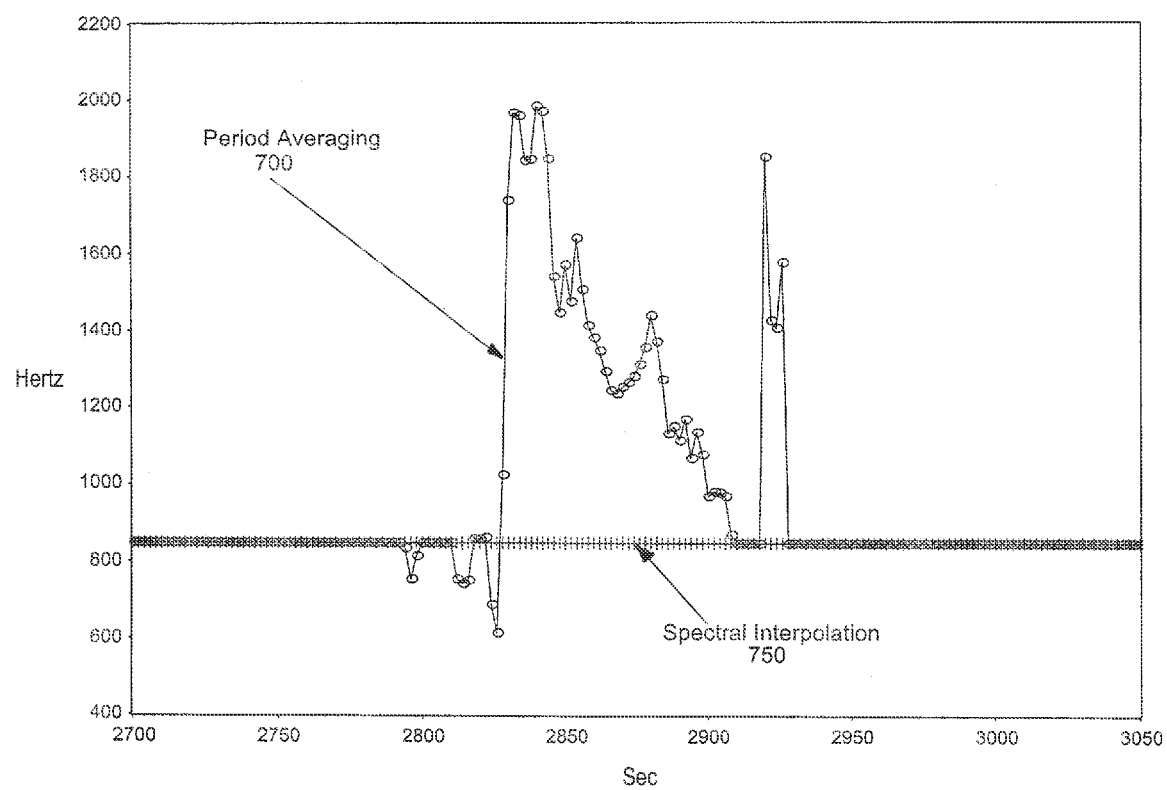
FIG. 7 is a chart illustrating sample vibrating wire gauge results created when an electric drill located approximately six inches from the gauge is turned on during the sampling interval.
Figure 8:
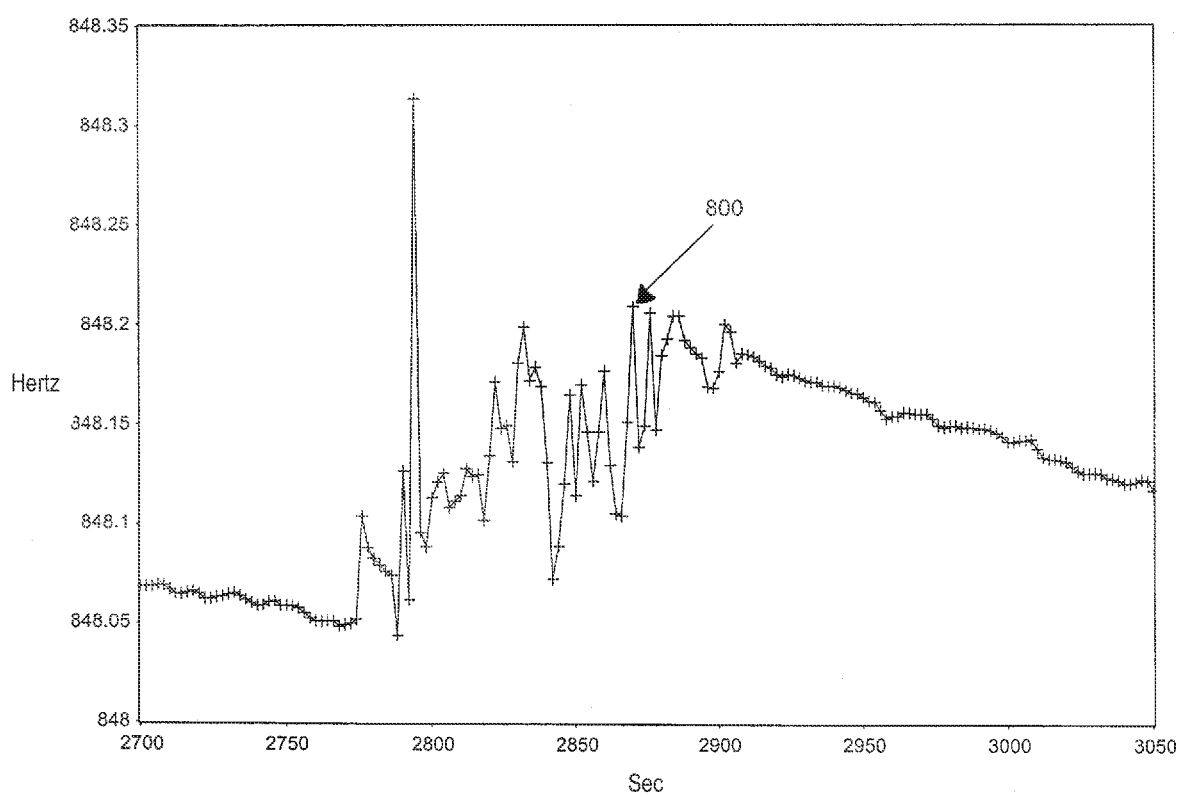
FIG. 8 is a chart further comparing the results of FIG. 7, with the x and y axes zoomed in to show the deviation between the two methods.

An additional aspect of one embodiment of the invention is improved noise rejection properties compared to those currently demonstrated using the period-averaging approach. FIG. 7 is a chart illustrating sample vibrating wire gauge results created when an electric drill located approximately six inches from the strain gauge is turned on during the sampling interval. The electromagnetic fields created by the operation of the electric drill illustrates an exemplary electric interference that may typically occur during the standard use and operation of a gauge. As illustrated by FIG. 7, the period-averaging method 700 returns an error during noisy conditions that were measured between +135% and −29% of the reading during noiseless conditions. FIG. 7 also includes a graph of the results of spectral interpolation 750 under the same conditions. The zoomed-in illustration of the results of FIG. 7 for the spectral interpolation method 800 are displayed in FIG. 8, where the spectral interpolation method 800 returned error results in the range of ±0.02% percent of the reading during noiseless conditions.

Figure 9:
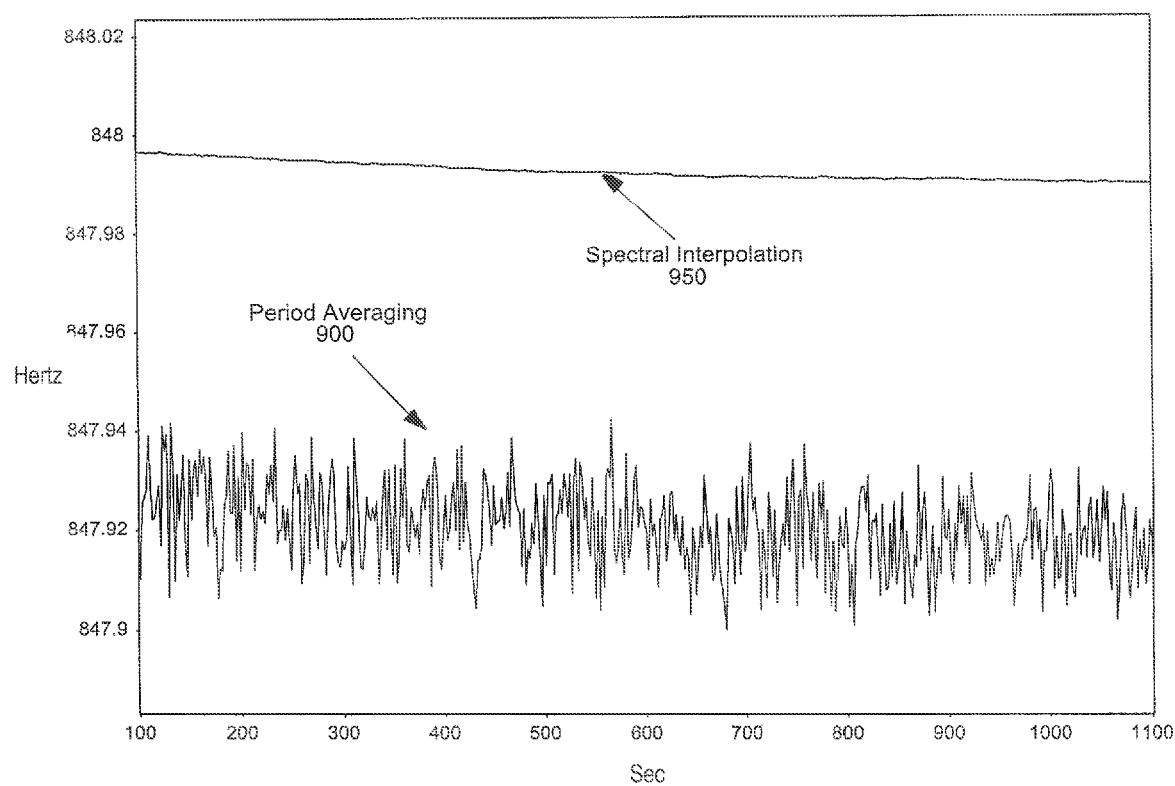
FIG. 9 is a chart displaying the results of a sample vibrating wire gauge frequency estimation according to the period-averaging method currently used in the art together with the method according to the present invention.

Another aspect of the present invention is improved resolution of results for a vibrating wire strain gauge. As shown in FIG. 9, the spectral interpolation method 950 may provide resolution within the 0.1 Hz standard that is currently used in the art, exceeding the requirement by a factor of 1000 during quiet conditions. By comparison, FIG. 9 also displays the results of the period-averaging method 900 used during the same vibrating wire experiment. As illustrated, the period-averaging method 900 provided less precise results, exceeding the 0.1 Hz requirement by only a factor of 125 during quiet conditions.

Figure 10:
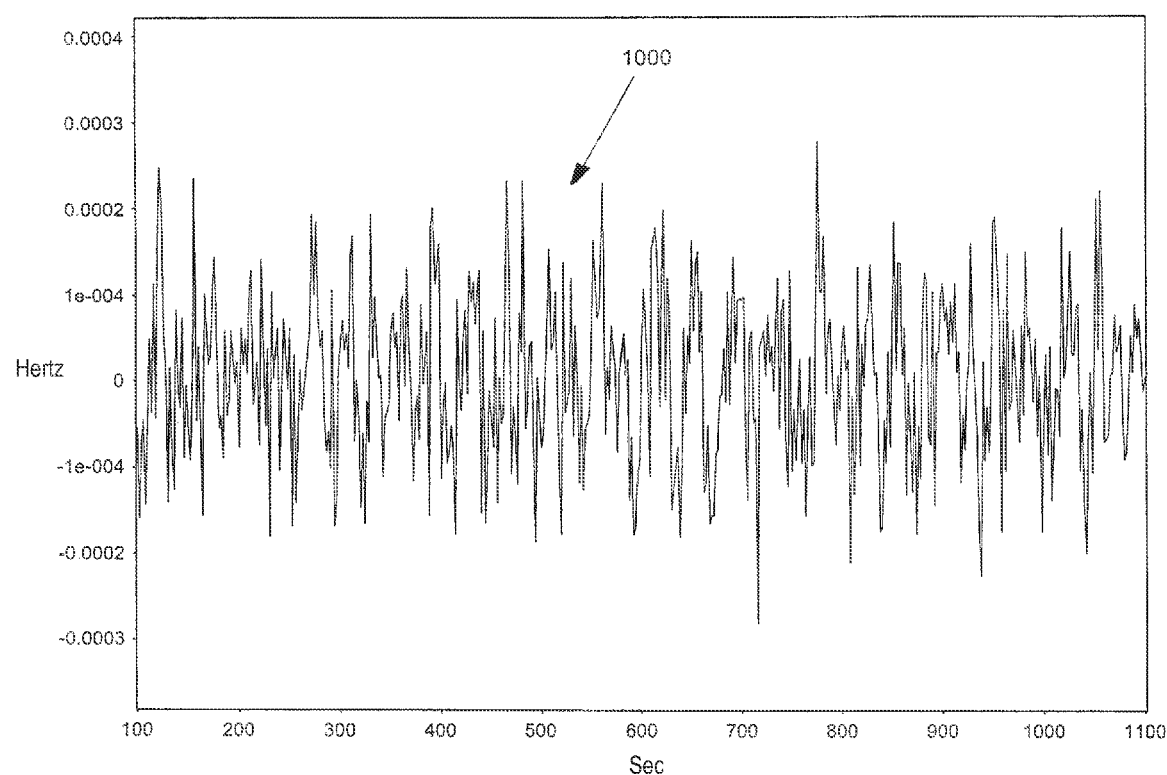
FIG. 10 illustrates the results of the vibrating wire experiment used in FIG. 9, using the spectral interpolation method disclosed in the present invention after the data have been detrended and mean-subtracted.
Figure 11:
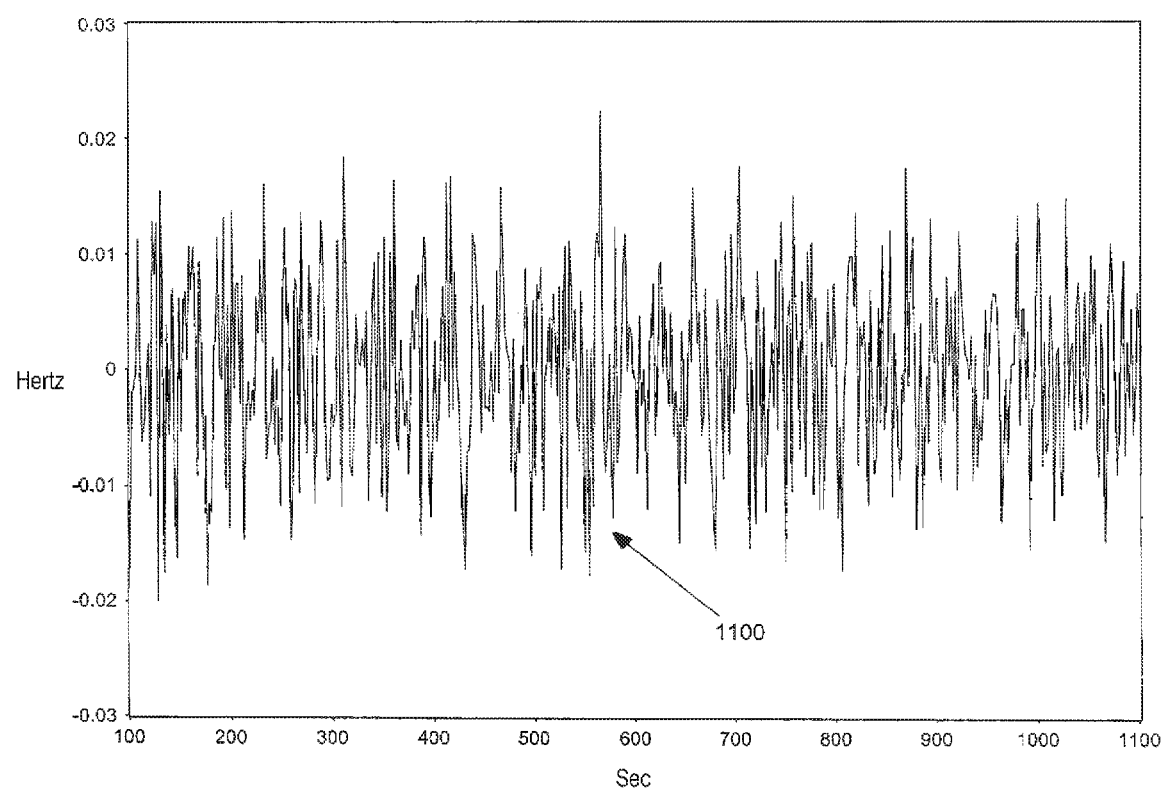
FIG. 11 illustrates the results of the vibrating wire experiment used in FIG. 9, using the period-averaging method used in the present art after the data have been detrended and mean-subtracted.

More specifically, FIG. 10 illustrates the results of the vibrating wire experiment used in FIG. 9, using the spectral interpolation method 1000 after the data has been detrended and mean-subtracted. The standard deviation of the detrended data is 0.085 mHz (0.085×10$^{-3}$ Hz) rms. By comparison, FIG. 11 illustrates the results of the same experiment used in FIG. 9, using the period-averaging method 1100, after the results were detrended and mean-subtracted. As illustrated, the period-averaging method 1100 was less precise, with a standard deviation of 7.9 mHz rms. Thus, the spectral interpolation method offers improved precision over the current methods used in the art.

As previously discussed, one aspect of the present invention is increased immunity of vibrating wire frequency results in noisy conditions compared to standard period-averaging methods currently used in the art. Another aspect of the present invention is the ability to offer increasingly immune results as the number of data points used in the interpolation method disclosed in the invention increases. FIGS. 12-16 illustrate the improved noise-immunity of the spectral interpolation method over various data lengths used in the method.

Figure 12:
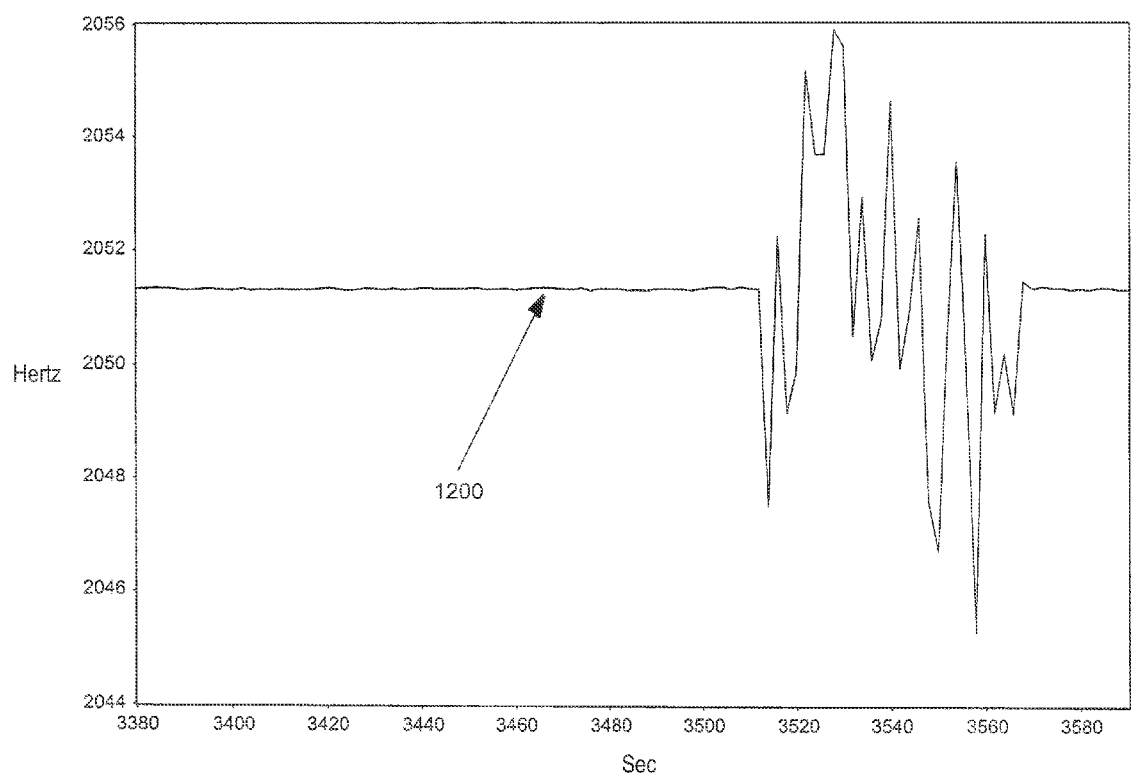
FIG. 12 illustrates the spectral interpolation method using a 256 point sample with an external noise source.
Figure 13:
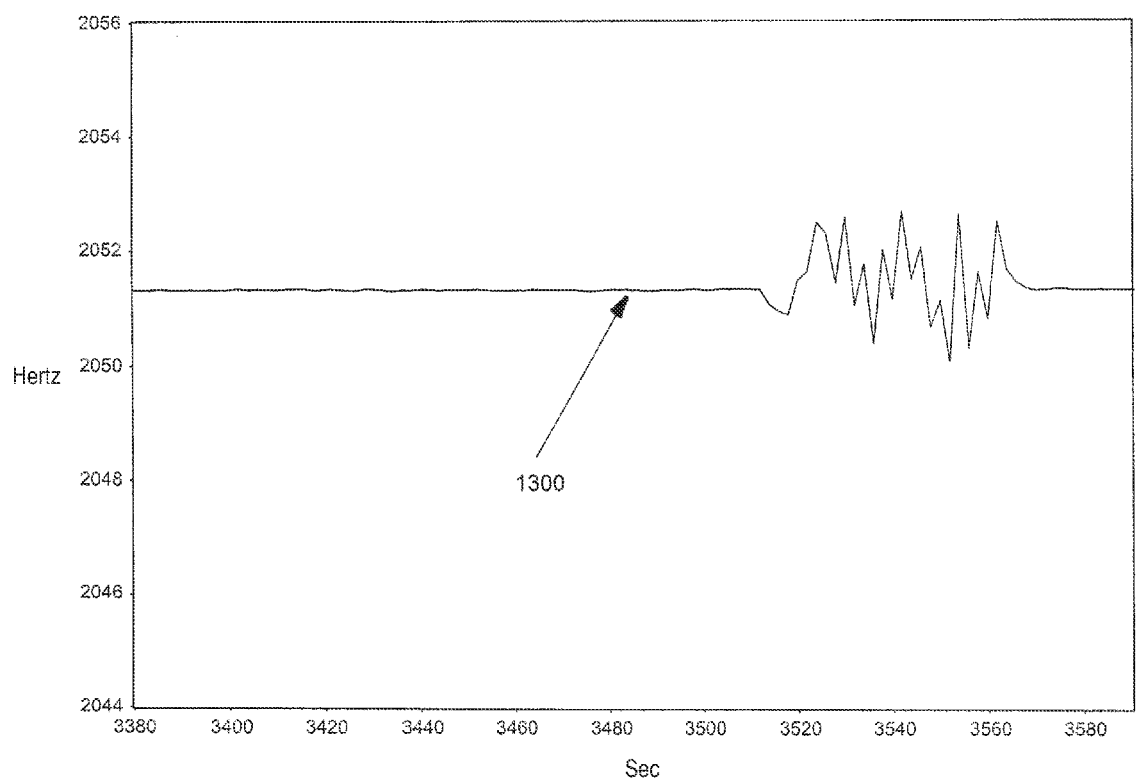
FIG. 13 illustrates the spectral interpolation method using a 512 point sample with an external noise source.
Figure 14:
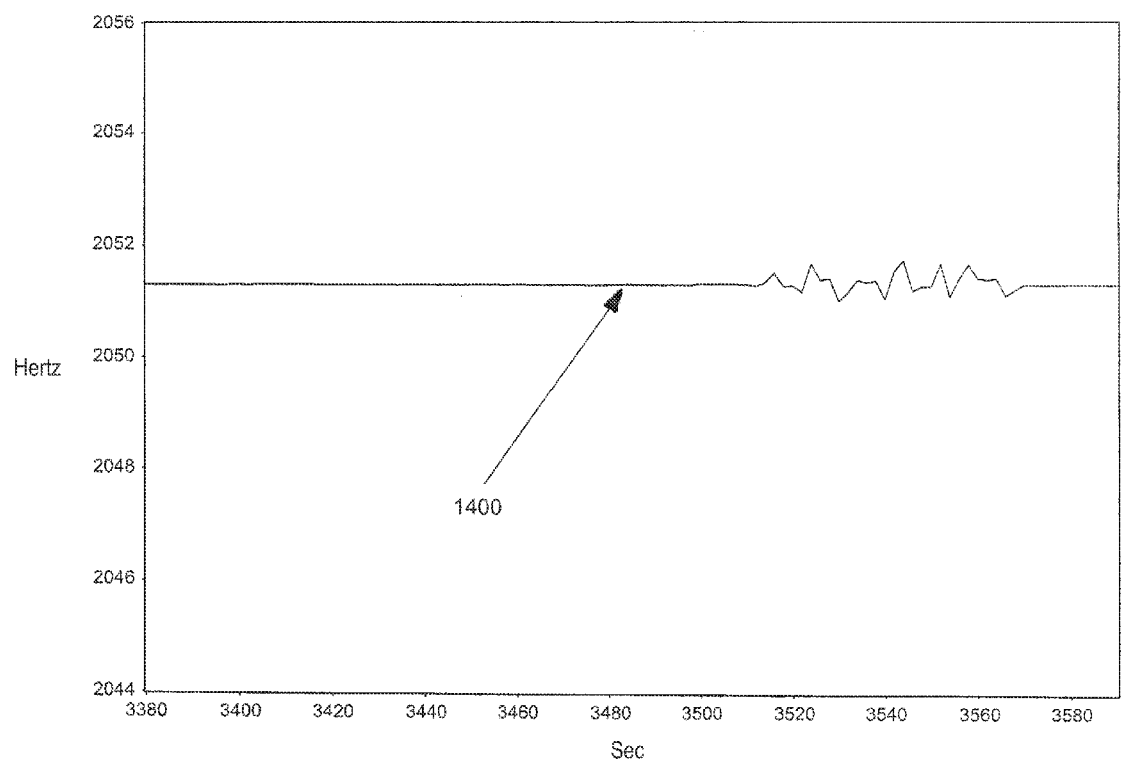
FIG. 14 illustrates the spectral interpolation method using a 1024 point sample with an external noise source.
Figure 15:
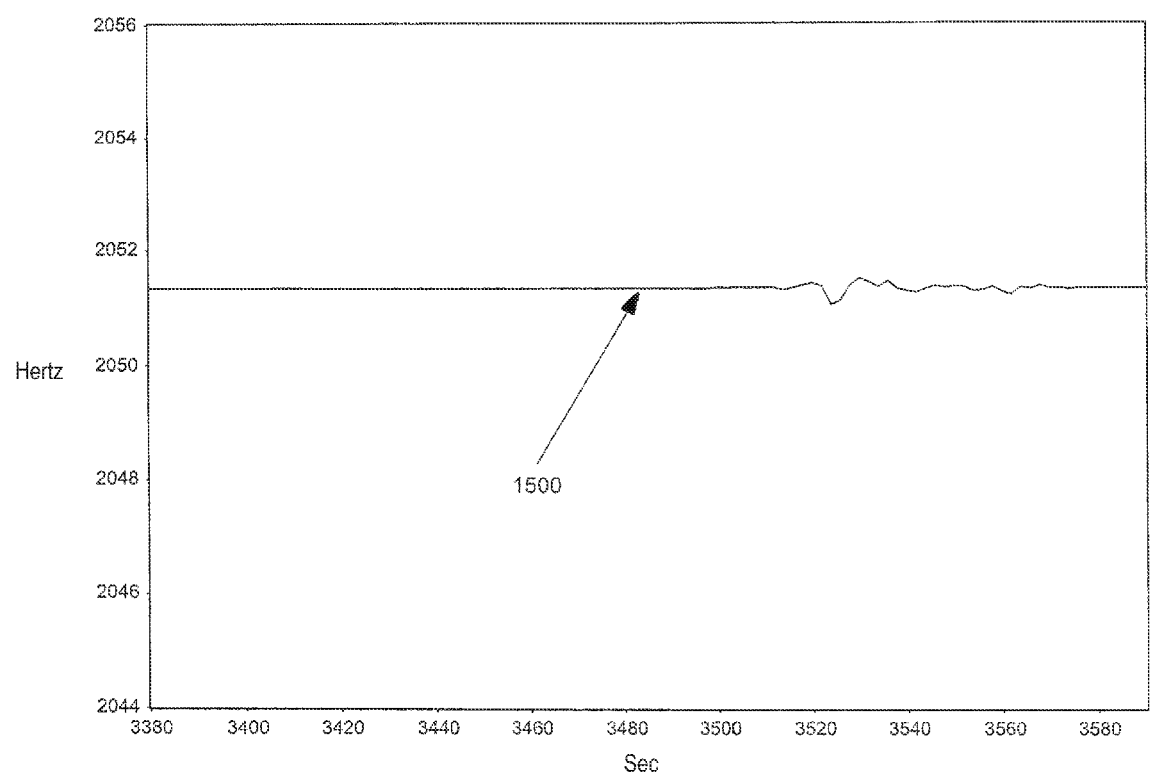
FIG. 15 illustrates the spectral interpolation method using a 2048 point sample with an external noise source.
Figure 16:
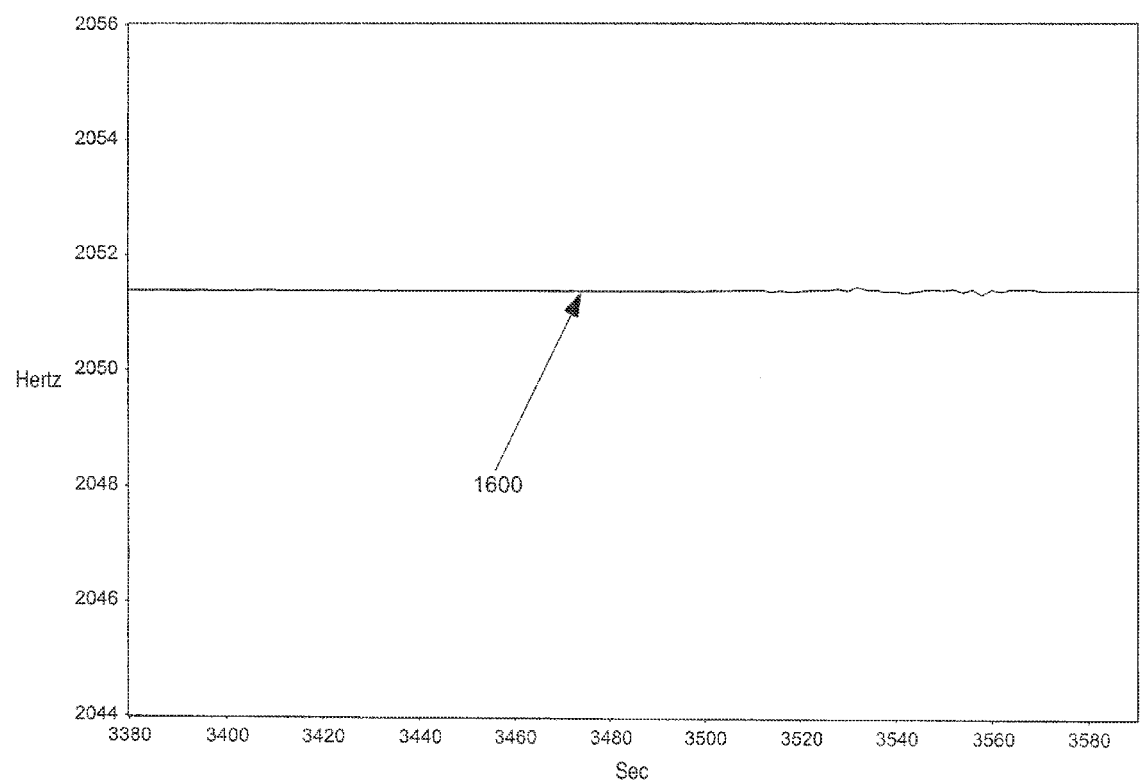
FIG. 16 illustrates the spectral interpolation method using a 4096 point sample with an external noise source.

FIG. 12 illustrates the spectral interpolation method 1200 using a 256 point sample with an external noise source turned on between 3510 and 3570 seconds. As shown, the noise-induced error is +4.5 Hz and −6.0 Hz. By comparison, FIG. 13 illustrates the spectral interpolation method 1300 using a 512 point sample during the same experiment. In the 512-point method 1300, the noise-induced error is +1.3 Hz and −1.3 Hz. Similarly, FIG. 14 illustrates the spectral interpolation method 1400 using a 1024 point sample during the same experiment and illustrates a noise-induced error of +0.45 Hz and −0.29 Hz. FIG. 15 illustrates the method 1500 using a 2048 point sample and returns a noise-induced error of +0.18 Hz and −0.28 Hz, and FIG. 16 illustrates the method 1600 using a 4096 point sample and returns error of +0.077 Hz and −0.069 Hz. Thus, the method according to one embodiment of the present invention results in improved noise immunity as the number of data samples used in the method increases.

Embodiments of the present invention may include or be conducted using a special purpose or general-purpose computer, processor, or logic device including various computer hardware and devices, as discussed in greater detail herein or known to one of ordinary skill. Embodiments within the scope of the present invention can also include computer-readable media for carrying or having computer-executable instructions or data structures stored thereon. Such computer-readable media can be any available media that can be accessed by a general purpose computer, special purpose computer, or a logic device. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose computer, special purpose computer, or other logic device. When information is transferred or provided over a network or other communication connection (either hardwired, wireless, or a combination of hardwired or wireless) to a computer, the reader can properly view the connection as a computer-readable medium. Thus, any such connection is properly termed a computer-readable medium. Various combinations of the above should also be included within the scope of computer-readable media. Computer-executable instructions comprise, for example, instructions, logic, and data which cause a general purpose computer, special purpose computer, or logic device to perform a certain function or group of functions.

Each of the processors described herein can be a single conventional general purpose computer, special purpose computer, or logic device, or each processor can be multiple processors including multiple conventional general purpose computer, special purpose computers, or multiple logic devices. Moreover, many of the functions that take place using a processor can be implemented on other types of logic devices, such as programmable logic devices. In addition, additional processors, logic devices, or hardware may be implemented to carry out a given function or step according to additional embodiments of the present invention. For example, additional processors may be implemented for storage and retrieval of data as is known to one of ordinary skill in the art. Such details have been eliminated so as to not obscure the invention by detail.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a vibrating wire gauge, a method for estimating the resonant frequency of a vibrating wire in the vibrating wire gauge, the method comprising:

digitizing a response of a vibrating wire that has been excited;

performing a transform on the digitized response to generate a frequency spectrum; and determining a resonant frequency of the response using spectral interpolation on the frequency spectrum generated from the transform of the digitized response in order to determine the resonant frequency of the response.

2. The method of claim 1, further comprising exciting the vibrating wire of a vibrating wire gauge.

3. The method of claim 2, further comprising receiving the response of the excited vibrating wire.

4. The method of claim 1, wherein determining a frequency of the response includes estimating the frequency of the response.

5. The method of claim 1, further comprising determining a physical property of the system based on the resonant frequency of the response.

6. The method of claim 5, wherein the physical property of the system is comprised of at least one of strain, stress, load, deflection, gas pressure, fluid pressure, displacement, fluid level, angular rotation, temperature, wind speed, fluid flow, snow-water-equivalent, or precipitation.

7. The method of claim 1, wherein performing a transform on the digitized response further comprises performing a Fourier transform.

8. The method of claim 7, wherein the Fourier transform comprises a radix-2 Fast Fourier transform.

9. The method of claim 1, wherein the spectral interpolation describes a central frequency as $m_{peak}=m_k-\text{real}(\delta)$, where real($\delta$) includes a real part of the $\delta$ correction factor defined as:

$$\delta = \frac{X(m_{k+1}) - X(m_{k-1})}{2X(m_k) - X(m_{k-1}) - X(m_{k+1})},$$

wherein $m_k$ comprises an integer index of the largest magnitude sample $|X(m_k)|$ and wherein values $X(m_{k-1})$ and $X(m_{k+1})$ comprise complex spectral samples on either side of a peak sample, and wherein, based on the complex spectral values, the central frequency $m_{peak}$ is computed and applied using $$f_{peak} = m_{peak}\frac{f_s}{N}$$

to provide a frequency estimate of the response in Hz, where $f_s$ is the sample rate and N is the number of samples in a time-sampled response.

10. In a system that includes a vibrating wire gauge, a method for estimating a physical property of the system surrounding the vibrating wire gauge, the method comprising:
digitizing a response of an excited vibrating wire in a vibrating wire gauge;
converting the digitized response into a frequency spectrum;
interpolating the frequency spectrum to determine a resonant frequency of the vibrating wire; and
determining a physical property of the system surrounding the vibrating wire gauge using the resonant frequency.

11. The method of claim 10, wherein the physical property of the system is comprised of at least one of strain, stress, load, deflection, gas pressure, fluid pressure, displacement, fluid level, angular rotation, temperature, wind speed, fluid flow, snow-water-equivalent, or precipitation.

12. The method of claim 10, wherein digitizing a response of an excited vibrating wire further comprises capturing the response.

13. The method of claim 10, wherein converting the digitized response into a frequency spectrum further comprises performing a transform on the digitized response from a time domain to a frequency domain.

14. The method of claim 13, wherein performing a transform further comprises performing a Fourier transform such that the frequency spectrum comprises a Fourier spectrum.

15. The method of claim 14, wherein the Fourier transform comprises a radix-2 Fast Fourier transform.

16. The method of claim 10, wherein interpolating the frequency spectrum to determine a resonant frequency of the vibrating wire further comprises performing spectral interpolation on the frequency spectrum.

17. The system and method according to claim 16, wherein the spectral interpolation describes a central frequency as $m_{peak}=m_k-\text{real}(\delta)$, where real($\delta$) includes a real part of the $\delta$ correction factor defined as:

$$\delta = \frac{X(m_{k+1}) - X(m_{k-1})}{2X(m_k) - X(m_{k-1}) - X(m_{k+1})},$$

wherein $m_k$ comprises an integer index of the largest magnitude sample $|X(m_k)|$ and wherein values $X(m_{k-1})$ and $X(m_{k+1})$ comprise complex spectral samples on either side of a peak sample, and wherein, based on the complex spectral values, the central frequency $m_{peak}$ is computed and applied using $$f_{peak} = m_{peak}\frac{f_s}{N}$$

to provide a frequency estimate in Hz, where $f_s$ is the sample rate and N is the number of samples in a time-sampled response.

18. The method of claim 10, wherein the method further comprises analyzing the frequency spectrum to distinguish noise from the resonant frequency of the vibrating wire.

19. The method of claim 10, receiving input that determines a number of data points used in interpolating the frequency spectrum to determine the resonant frequency.

20. A system for estimating the resonant frequency of a vibrating wire in a vibrating wire gauge, the system comprising:
an interface adapted to connect with a vibrating gauge, wherein data collected from an excited wire in the vibrating gauge is received in the connected interface; and
a processing unit connected to the interface, the processing unit comprising:
a data acquisition system that samples and generates digitized data from a signal received over the interface from the vibrating gauge; and
a computer processing unit that transforms the digitized data into a frequency spectrum and identifies an estimated resonant frequency of the vibrating wire from the frequency spectrum by performing spectral interpolation on the frequency spectrum.

21. The system of claim 20, where the processing unit is incorporated within the interface.

22. The system of claim 20, where the vibrating gauge is connected to a structural member.

23. The method of claim 22, where the computer processing unit determines a physical property of the structural member based on the estimated resonant frequency of the vibrating wire.

24. The system of claim 23, wherein the physical property of the structural member is comprised of at least one of strain, stress, load, deflection, gas pressure, fluid pressure, displacement, fluid level, angular rotation, temperature, wind speed, snow-water-equivalent, fluid flow, or precipitation.

25. The system of claim 23, wherein the computer processing unit determines a physical property of the structural member and displays the physical property on a display.

* * * * *